United States Patent [19]

Ikeda et al.

[11] Patent Number: 5,408,645

[45] Date of Patent: Apr. 18, 1995

[54] CIRCUIT AND METHOD FOR DETECTING A FAILURE IN A MICROCOMPUTER

[75] Inventors: Hiroshi Ikeda; Akito Yamamoto, both of Yokohama, Japan

[73] Assignee: Nissan Motor Co., Ltd., Yokohama, Japan

[21] Appl. No.: 904,306

[22] Filed: Jun. 25, 1992

[30] Foreign Application Priority Data

Jun. 25, 1991 [JP] Japan .................................. 3-180122

[51] Int. Cl.⁶ .......................................... G06F 11/00
[52] U.S. Cl. .................................. 395/575; 371/16.1; 371/16.3
[58] Field of Search ............ 371/16.3, 61, 57.2, 371/16.1, 62; 395/575

[56] References Cited

U.S. PATENT DOCUMENTS

| | | | |
|---|---|---|---|
| 4,392,208 | 7/1983 | Burrows et al. | 364/900 |
| 4,639,921 | 1/1987 | Gang et al. | 371/53 |
| 4,727,549 | 2/1988 | Tulpule et al. | 371/25.1 |
| 4,796,211 | 1/1989 | Yokouchi et al. | 371/16.3 |
| 4,866,713 | 9/1989 | Worger et al. | 371/16.3 |
| 4,956,807 | 9/1990 | Hosaka et al. | 364/900 |
| 5,012,435 | 4/1991 | Bailey et al. | 371/16.3 |
| 5,040,178 | 8/1991 | Lindsay | 371/16.1 |
| 5,043,984 | 8/1991 | Tomisawa et al. | 371/16.1 |
| 5,210,758 | 5/1993 | Gomez | 371/16.1 |

*Primary Examiner*—Robert W. Beausoliel, Jr.
*Assistant Examiner*—Joseph S. Palys
*Attorney, Agent, or Firm*—Foley & Lardner

[57] ABSTRACT

A circuit and method for detecting a failure in a microcomputer are disclosed in which a watch-dog timer monitors an internal state of the microcomputer at an internal node representing the internal state and an error detection signal used to inform the failure of the microcomputer is output when a particular internal state to be generated on the internal node within a predetermined period of time. Particularly, in a preferred embodiment where the internal node is an output portion of a microprogram memory, microinstructions are monitored which serves as control signals used within or externally to the microcomputer.

4 Claims, 10 Drawing Sheets

CIRCUIT AND METHOD FOR DETECTING A FAILURE IN A MICROCOMPUTER

BACKGROUND OF THE INVENTION

1. Field of The Invention

The present invention relates generally to a circuit and method for detecting a failure of a microcomputer.

2. Description of The Background Art

How to detect a failure in a microcomputer or a microprocessor (both are hereinafter referred to as a microcomputer) includes the following four techniques.

First, the detection of failure in the microcomputer is based on a hardware failure detection using a redundant coding, e.g., a parity checking method. This method needs to be used according to an object to be detected in viewpoint of a fault tolerance. This method is referred to as an ECC (=Error Correcting Code) including an error correction and is described in a Japanese Magazine titled "Microcomputer Architecture" (Ohm Sha, page 209).

Second, a self-checking function is incorporated into the circuit itself so as to perform the error check operation by it self. This is exemplified by a Japanese Paper "Electronic Information and Communication Society, Vol. 73, No. 9" (page 991 to page 999). In this case, a perfect check is possible for a failure model prerequisite for its circuit construction such as a uni-regenerate model, i.e., a uni node fixed to 0 or 1.

Third, for example, the three microcomputers are prepared to carry out a multiple time division transmission with each other and to take a majority logic. This can construct a functionally reasonable system architecture. This can be used in a large-scale system such as a non-stop computer or aircraft running control.

Fourth, a monitoring function such as a watch-dog timer is added to the microcomputer as exemplified by a Japanese book called "microcomputer handbook" in page 751. As disclosed in the Japanese book, the watch-dog timer is externally attached to the microcomputer.

In more detail, a counter installed in the watch-dog timer is reset in response to an instruction in a program of the microcomputer. When the program runs in an abnormal loop, the counter overflows to output an error signal. The error signal is used as a reset signal or interrupt signal to reset the microcomputer or to resume a series of processings tasked to the microcomputer or so as to exchange the microcomputer with a back-up microcomputer. In such a failure detection by means of the watch-dog timer, the failure model is not supposed. Therefore, the hardware failure is not limited to the uni-regenerate model failure and the detection of failure by means of the watch-dog timer has an advantage that it can also detect software bugs, circuit design errors, and software errors in memories and/or gates as well.

However, in the first and second techniques described above, it is difficult to detect all failures. For example, the ECC method limited to a restricted hardware source, has a limitation such that the number of bits which can be detected and corrected is limited and as the number of errors are increased, the error correction and detection cannot be performed.

In addition, in the self-checking function, it is difficult to cope with a multiplex regenerate failure, a failure such that any of transistors become conductive in an intermediate state between its turn on and turn off, or such a gate software failure as a gate circuit software error due to a defective $\alpha$ ray irradiation on the gate circuit. In the microcomputer wherein a real time processing is carried out, processing speed is a major problem. Therefore, a large scale circuit structure incorporating such a sign check or self-checking function as described above undesirably increases in the number of gate circuits and delays.

In the third technique, a hardware structure tremendously increases so that it is not practical to apply to a small or middle sized computer system.

In the fourth technique, although the failure model is not limited but the source of errors cannot be located. Furthermore, it takes a long time to detect the failure and the error may be propagated over the whole system until the error is detected.

To cope with such problems as described above raised against each technique, such a combination that the microcomputer having the function of the parity check or structure of ECC is externally attached with the watch-dog timer can be considered. However the combination technique makes the whole structure complex and the processing speed of the microcomputer is reduced.

SUMMARY OF THE INVENTION

It is therefore a principal object of the present invention to provide a method and circuit for detecting a failure in a microcomputer suitable for a microcomputer requiring high speed, real-time processing which cannot reduce the data processing speed, to improve a failure (error) detection rate, can prevent the error propagation in the time it takes from the occurrence of a failure to the detection of the failure using a limited hardware structure.

The above-described object can be achieved by providing a circuit of a microcomputer for detecting a failure in the microcomputer, comprising: a) a first comparator, connected to an internal node of the microcomputer, for inputting such an internal state of the microcomputer as to change during an operation of the microcomputer but not to be converted into an external output form as a monitor input, for inputting a particular internal state to be generated on the internal node during a normal operation of the microcomputer as a reference data of comparison, and for outputting a signal when the internal state as the monitoring input coincides with the particular internal state as the reference data of comparison; b) a counter for measuring a time; and, c) an output block for generating and outputting an error detection signal on a basis of a predetermined condition related to an output of the first comparator within a predetermined count of the counter set so as to relate to a program running period.

The above described object can also be achieved by providing a structure of a watch-dog timer for detecting a failure in a microcomputer, comprising: a) comparison means, connected to an internal node of the microcomputer, said internal node defining an internal status of the microcomputer excepting the status which is output from the microcomputer so as to be enabled to be monitored from its external, for monitoring whether the internal status changing during an operation of the microcomputer coincides with a particular internal state which would appear on the internal node if the microcomputer operated normally and for outputting a coincidence signal when they coincides with each other; and b) counting means for counting a number of regularly output signals to measure a time and outputting an overflow signal whenever the count value thereof reaches a predetermined limit value, said counting means being reset when receiving the coincidence signal and said overflow signal being served as an error detection signal.

The above-described object can be achieved by providing a method for detecting a failure in a microcomputer, comprising the steps of: a) inputting an internal state of the microcomputer such as to change during an operation of the microcomputer but not to be converted into an external output form as a monitoring input; b) inputting a particular internal state to be generated in the internal node during a normal operation of the microcomputer as a reference data of comparison; c) outputting a signal when the internal state as the monitoring input coincides with the particular internal state as the reference data of comparison; d) measuring a time; and,e) generating and outputting an error detection signal on a basis of a predetermined condition related to an output of the first comparator within a predetermined count of the counter set so as to relate to a program running period.

DESCRIPTION OF THE PREFERRED EMBODIMENTS

Reference will hereinafter be made to the drawings in order to facilitate a better understanding of the present invention.

Figure 1:
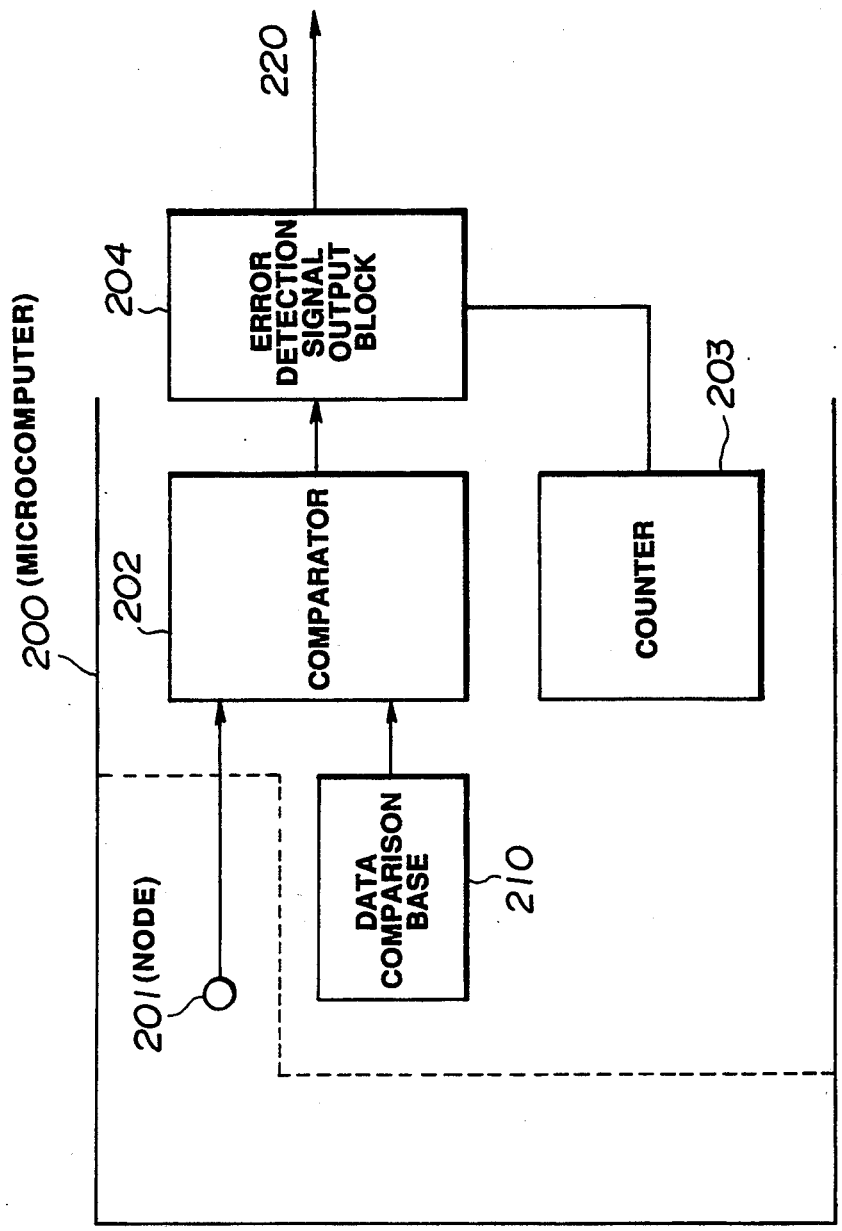
FIG. 1 is a function block diagram of a failure detecting circuit for a microcomputer for explaining a general concept of the present invention.

FIG. 1 shows h general concept of the present invention for explaining the general concept of failure detection in a microcomputer in the case of the present invention.

In FIG. 1 a failure detection circuitry for a microcomputer 200 according to the present invention includes: a comparator 202, connected to an internal node 201, for receiving and monitoring an internal state of the microcomputer 200 which changes during an operation of the microcomputer 200 and which is not converted into an external output form and for outputting its output signal when the monitored and input internal state coincides with a particular internal State to be generated on the internal node 201 as a comparison data, the comparison data being the particular internal state to be generated on the internal node 201 when the microcomputer operates normally; and a counter 203 which measures time; and an output block 204 which outputs an error detections signal 220 on the basis of a predetermined condition related to the output signal of the comparator 202 within a predetermined count of time set in relation to a program running period of time by means of the counter 203.

The internal node 201 denotes an IC chip incorporated internal node within the chip of the microcomputer 200 including an internal signal bus of a one-chip microcomputer except such data which can be viewed externally or which can be monitored via a port or buffer or can be output to the external of the microcomputer.

As the internal state in the case of FIG. 1, microinstructions Output from a micro program memory, operation codes (0P codes) or internal addresses of instruction sets, and output of a program counter, and a value of a stack pointer are used.

In nested storage types (push-down), the address of the location at a top of a column is often called the stack pointer and is held in a pre-assigned register.

The operation code is defined as that part of an instruction that designates the operation of arithmetic, logic, or transfer to be performed.

Figure 2:
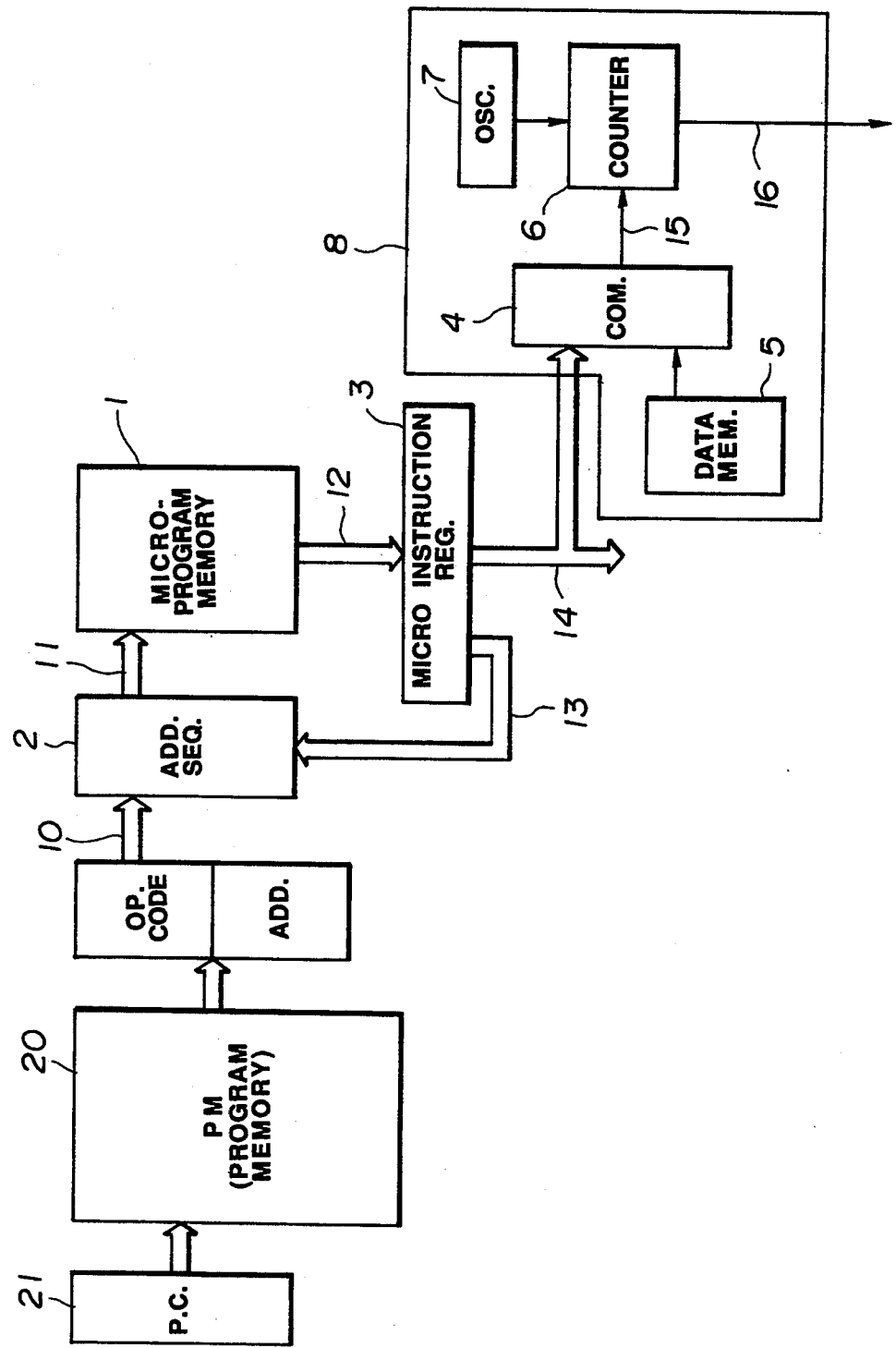
FIG. 2 is a circuit block diagram for the failure detecting circuit in a first preferred embodiment according to the present invention.

FIG. 2 shows the failure detecting circuit in a first preferred embodiment according to the present invention which is applicable to a micro-program storing block of the microcomputer 200.

As shown in FIG. 2, the operation code 10 is fetched by means of an address sequencer 2 from a program memory 20. In the first preferred embodiment, the operation code 10 is supplied directly as an address 11 of a micro-program memory 1.

A data 12 is output from the micro-program memory 1 according to the content of the address 11 and is stored in a microinstruction register 3. The data 12 stored in the microinstruction register 3 is constituted by the next address 13 and a microinstruction 14, the next address 13 being supplied to an address sequencer 2 and being used to read the next microinstruction.

The microinstruction is a small and single add, shift, or delete type of command.

In this way, each of the microinstructions 14 are sequentially issued to control each module such as register (not shown ), memory, port, and calculator.

Each microinstruction 14 is sequentially compared with a predetermined instruction data set in a comparison data memory 5 by means of a (digital) comparator 4. When any one of the microinstructions coincides with the predetermined instruction data, a reset signal 15 is issued from the comparator 4 to reset the counter 6. The counter 6 counts the number of pulses derived from an oscillator 7. When a predetermined period of time has passed and the same content of the microinstruction 14 does not appear as the predetermined instruction data in the comparison data memory 5, the counter 6 overflows. That is to say, when no reset signal appears, the counter 6 overflows so as to output an overflow signal, i.e., an error detection signal 16.

Then, a watch-dog timer 8 is formed including the comparator 4, the comparison data memory 5, the counter 6, and the oscillator 7. In response to the error detection signal 16 derived from the watch-dog timer 8, the microcomputer 200 is reset to restart the halted program, is interrupted to execute another program, or is backed-up by means of another microcomputer so that an appropriate fail-safe structure is adapted to be operated.

A pattern in the case of the detection of failure in the case of the first preferred embodiment will be described in more detail with reference to FIGS. 3 (A) through 3 (C).

Figure 3A:
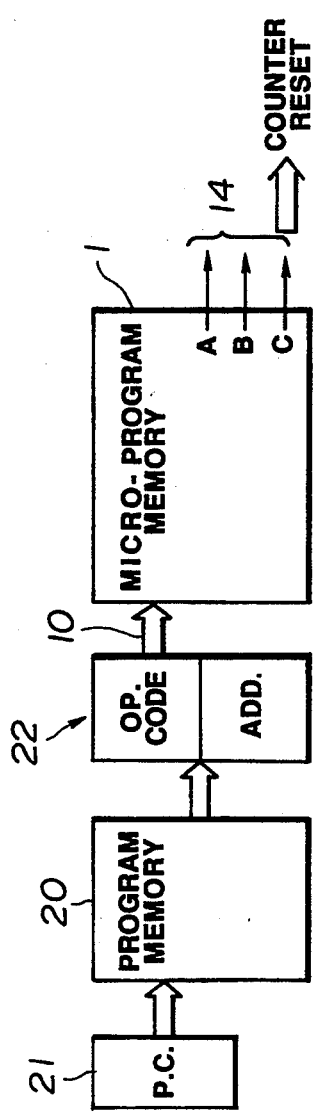
FIGS. 3 (A) to 3 (C) are explanatory views of the failure detecting circuit for explaining a series of operation in the failure detecting circuit shown in FIG. 2.
Figure 3B:
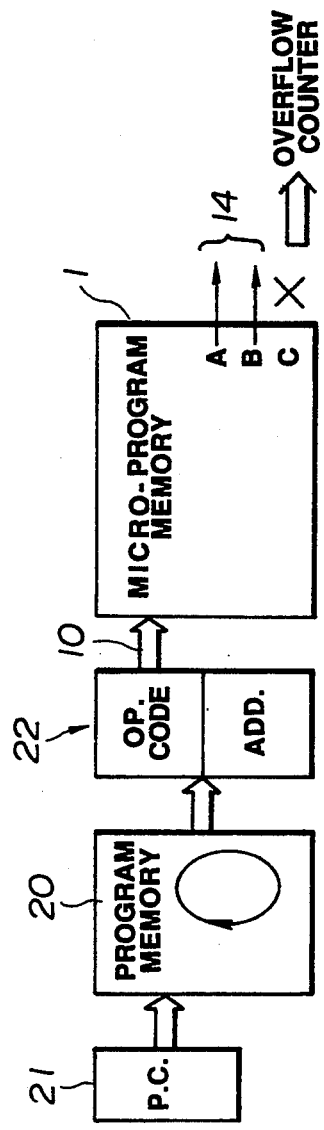
Figure 3C:
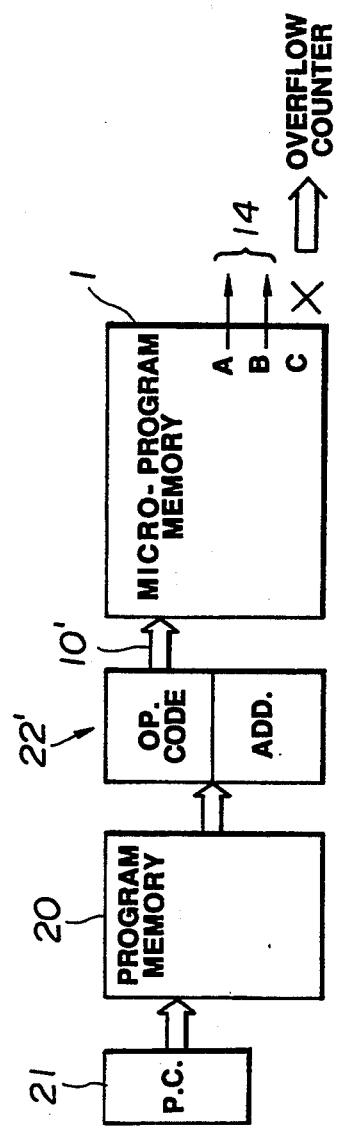

First, in the normal operation state of the microcomputer 200, one instruction set 22 is read from the program memory 20 in response to an address designation from the program counter 21 as shown in FIG. 3 (A).

The operation code 10 is transmitted to the microprogram memory 1 and the micro-instruction 14 is output therefrom to execute the control over the microcomputer structure. The sequentially output microinstructions 14 includes A, B, and C. When the predetermined micro-instruction C is set in the comparison data memory 5, the counter 6 of the watch-dog timer 8 is reset before its overflow and no error detection signal 16, in this case, is output.

However, as shown in FIG. 3 (B), when the routine enters, e.g., a read-out mode for reading the program memory 20 in an unlimited or infinite loop, the instruction set 22 is also circulated so that C of the microinstruction 14 is not derived from the micro-program memory 1 within the predetermined period of time. At this time, the counter 6 of the watch-dog timer 8 overflows and the error detection signal 16 is also output.

Furthermore, as shown in FIG. 3 (C), in a case where any one instruction set 22' is erroneously fetched and in a case where the operation code 10' is erroneously sent to the micro-program memory 1, the C of the microinstruction 14 is not output for the predetermined period of time and, therefore, the error signal 16 is output.

In the first preferred embodiment described above, both functions of the watch-dog timer which monitors the flow of program and which monitors the control signal, i.e., the output microcomputer of the microprogram memory as well can be achieved.

A reset signal is conventionally issued to an I/O port previously specified by a program, in the conventional watch-dog timer, to reset the counter of the watch-dog timer. Therefore, in the conventional watch-dog timer, the control signal of the microcomputer cannot be monitored and it takes a longer time to locate the trouble in the flow of program even when a read out failure in the microinstruction is present.

As compared with the conventional function of the watch-dog timer, the watch-dog timer in the first preferred embodiment can monitor the flow of the program according to whether a predetermined microinstruction, e.g., I/O set instruction appears and can easily detect such a read error of the micro-instructions and such a failure in the transfer of operation codes as well.

Since the micro-instruction, which is the control signal of the microcomputer, requires a short time it takes from its failure to the detection, the failure detection percentage can be improved. In addition, the time it takes to detect that failure is short and a speedy procedure and/or back-up operation can be carried out upon the occurrence in the failure.

Figure 4:
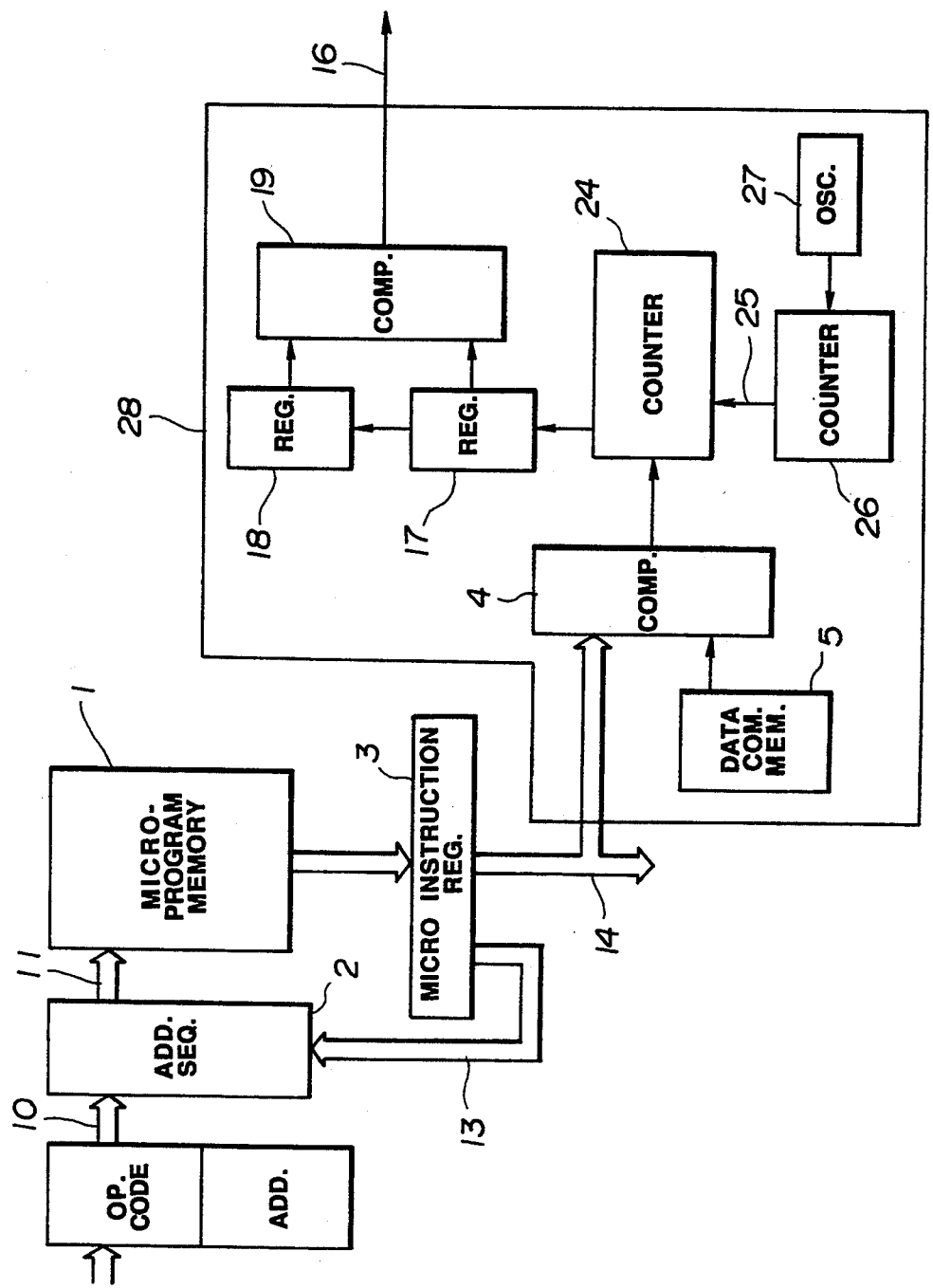
FIG. 4 circuit block diagram for the failure detecting circuit in a second preferred embodiment according to the present invention.

FIG. 4 shows a second preferred embodiment of the failure detecting apparatus according to the present invention.

In FIG. 4, the watch-dog timer 28 monitors the output situation of the microprogram memory in the same way as in the first preferred embodiment. However, in the second preferred embodiment, the failure detection is carried out through the watch-dog timer 28 depending on the number of micro-instructions read from the microprogram memory. Each of the microinstructions 14 is sequentially compared with the predetermined instruction data in the comparison data memory 5. When they coincide with each other at the Comparator 4, a counter 24, as a second counter, counts incrementally the output signal of the comparator 4. During a constant period of time which is measured by the oscillator 27 and counter 26, the count up is carried out at the counter 24 and the counted result is registered in a comparison register 17. In response to the reset signal 25 derived from the counter 26, the counter 24 is reset. The count value registered in the register 17 is transferred to another comparison register 18.

In the next running program period, both comparator 4 and counter 24 count up the same number as the instruction data in the comparison data memory 5 from among the micro-instructions 14 and counted up value is supplied to the register 17. A comparator 19, as a second comparator, serves to compare the value in the register 17 with a value stored in a register 18 at the time of a previous program running period and output an error detection signal when they do not coincide with each other.

This permits a correct detection of failure since the number of coincided micro-instructions is different if the program enters the unlimited loop in a pattern including one of the micro-instructions used for monitoring as the comparison instruction data.

In the second preferred embodiment, since the number of micro-instructions within a range in which the program counter indicating the internal state of the microprocessor can specify are measured so that even a giant program running scale can be measured by an appropriate number of microinstructions. That is to say, even if a microinstruction A is used by 1000 number of times within a certain program, the corresponding microinstruction is used by several ten number of times if the program counter has a counting range of 00 through FF. Therefore, the monitoring can be assured by an appropriate count value, As described above, since the internal state is used, a check point used for the correct flow of program may not be included in the program and the failure detection rate is high.

In addition, if the micro-instructions used by an appropriate number are selected as the comparison instruction data, an effective monitoring with less count than those for monitoring the program can be conveniently be achieved.

It is noted that the constant time to reset the counter 24 can be deemed to be the program period viewed from the address of tile program memory or program counter.

Figure 5:
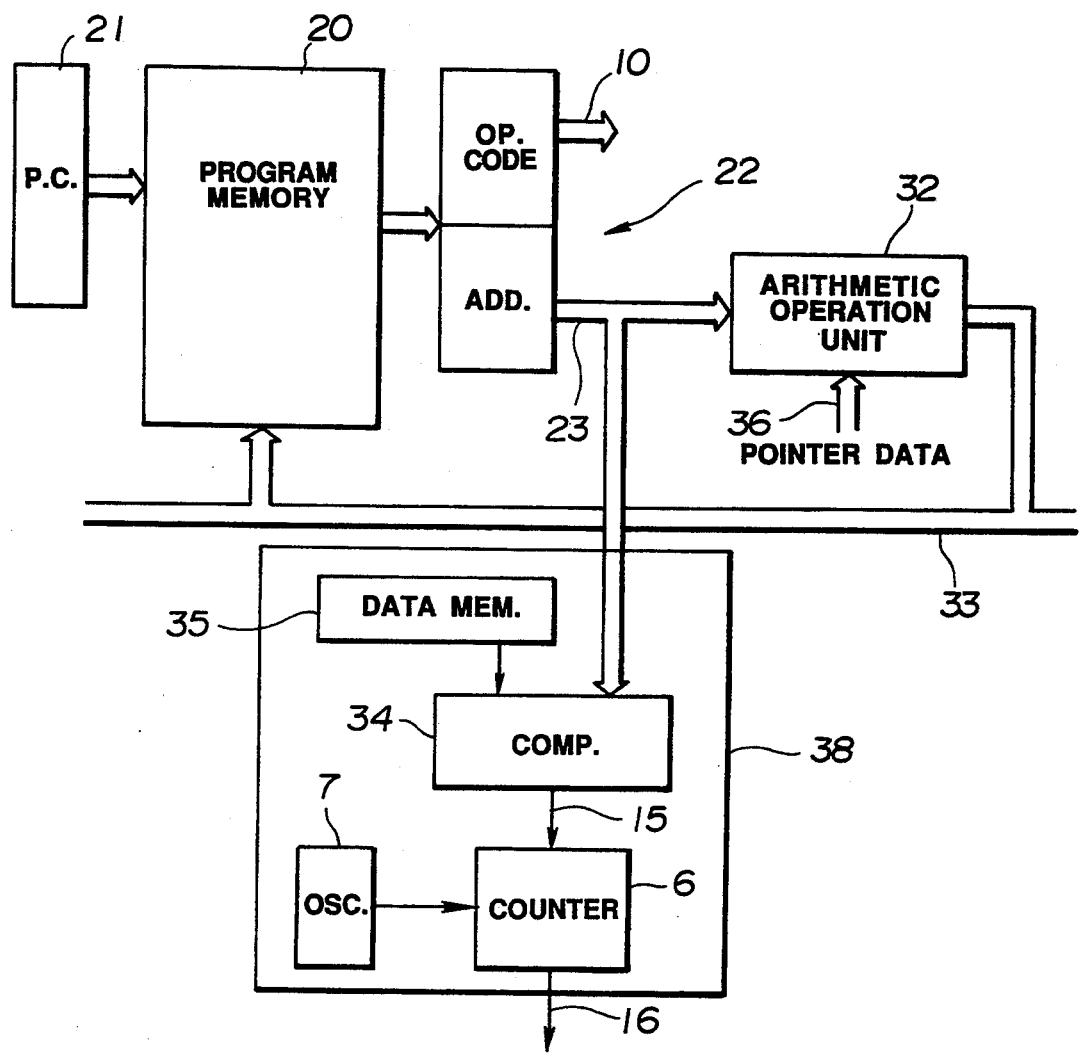
FIG. 5 is a circuit block diagram for the failure detecting circuit in a third preferred embodiment according to the present invention.

FIG. 5 shows a third preferred embodiment of the failure detecting apparatus.

The third preferred embodiment exemplifies the monitoring for the failure according to each address situation.

An instruction set 22 read from the program memory 20 includes the operation code (op-code) 22 and internal address (operand) 23.

The internal address 23 and address in an address bus 33 used to access the external memory are generally different from each other.

An indirect address is an address that specifies a storage location whose content is either an indirect address or another indirect address or a single instruction address that is at once the address of another address.

The internal address 23 is output as the relative address or indirect address. The internal address 23 is calculated at an arithmetic and logic operation unit 32 together with a pointer data 36 and is converted into a physical address to be output to the address bus 33.

A comparator 34 compares the output of the internal address 23 with a predetermined address set in the comparison data memory 35. When they coincide with each other, the watch-dog timer 38 outputs a reset signal 15 to reset the counter 6. When the same address as the comparison address data is not reached at the comparator 34 within the predetermined period of time, the counter 6 overflows and the error detection signal 16 is issued.

In the third preferred embodiment, the same address value as that written in the program which serves as the comparing predetermined address, i.e., relative or indirect address may be written.

Hence, as compared with the conventional structure in which the conventional watch-dog timer monitors the address 0n the address bus 33, it is not necessary to convert the relative or indirect address into the physical address. Since the internal state as the internal address 23 is used, the failure detection is speedily carried out without inconveniences.

Figure 6:
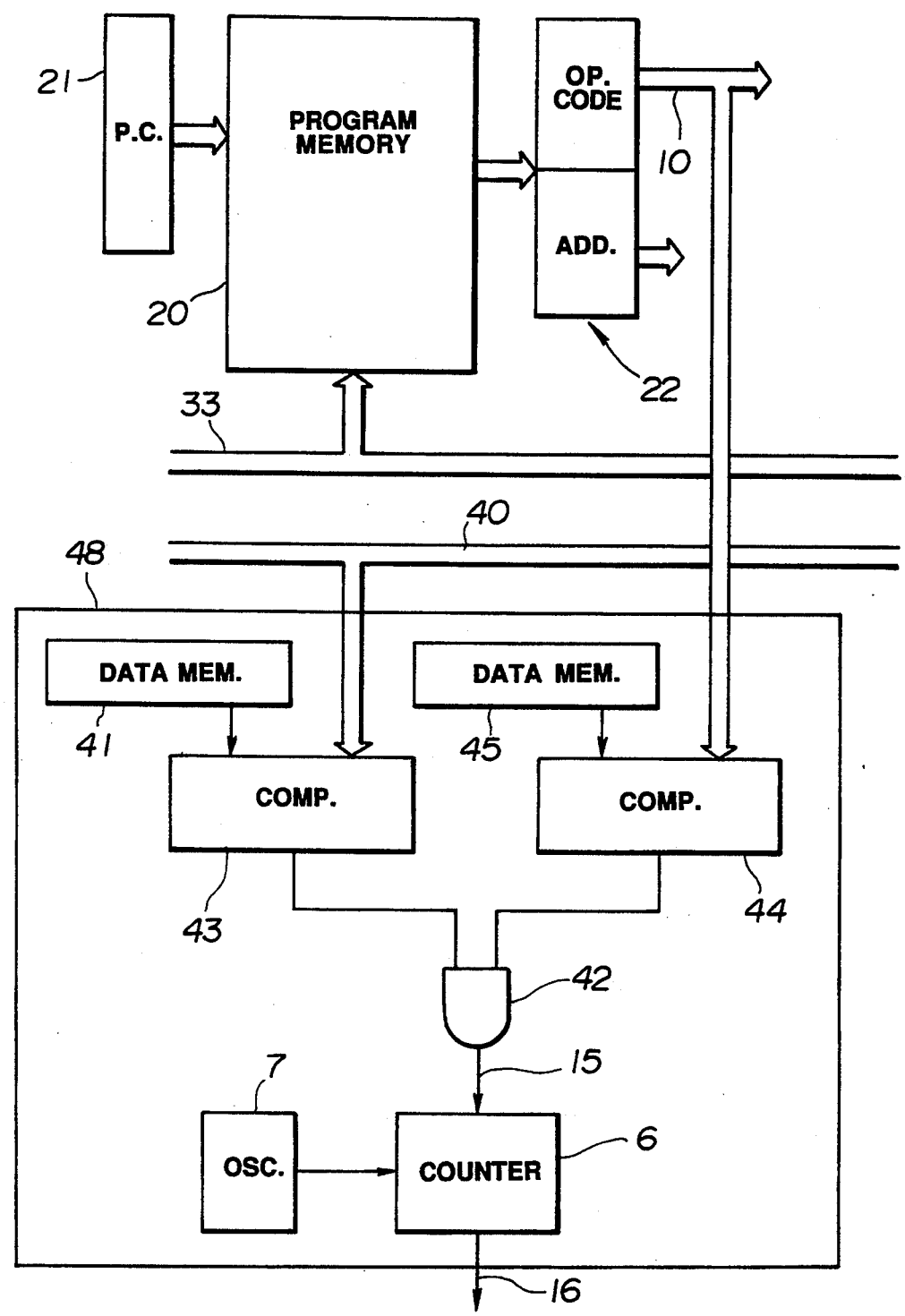
FIG. 6 is a circuit block diagram for the failure detecting circuit in a fourth preferred embodiment according to the present invention.

FIG. 6 shows a fourth preferred embodiment of the failure detecting apparatus for monitoring the failure according to the information on the data bus as an object to be monitored.

The watch-dog timer 48, in the fourth preferred embodiment, uses the operation code 10 to monitor the address information to be transferred onto the data bus 40.

That is to say, the comparator 44 compares the op-code 10 within the instruction set 22 output from the program memory 20 with a predetermined op-code set in the comparison data memory 45 by means of a comparator 44. As the predetermined op-code in the comparison data memory 45, an instruction to supply the address information provided as the data to the data bus 40 is selected.

Hence, when the op-code 10 coincides with the predetermined op-code in the comparison data memory 45, at least address information consequently flows in the data bus 40. The comparator 43, as the second comparator, compares the information flowing in the data bus 40 with a predetermined address data set in the comparison data memory 41. The predetermined address data is an address which is the content of instruction in the predetermined op-code of the comparison data memory 45.

When the results of comparisons in both comparators 43 and 44 indicate the coincidences, the reset signal 15 is output. In this way, the address information on the data bus 40 can be monitored with the data in the internal state as a reference of comparison and the failure detection rate can be improved.

Figure 7:
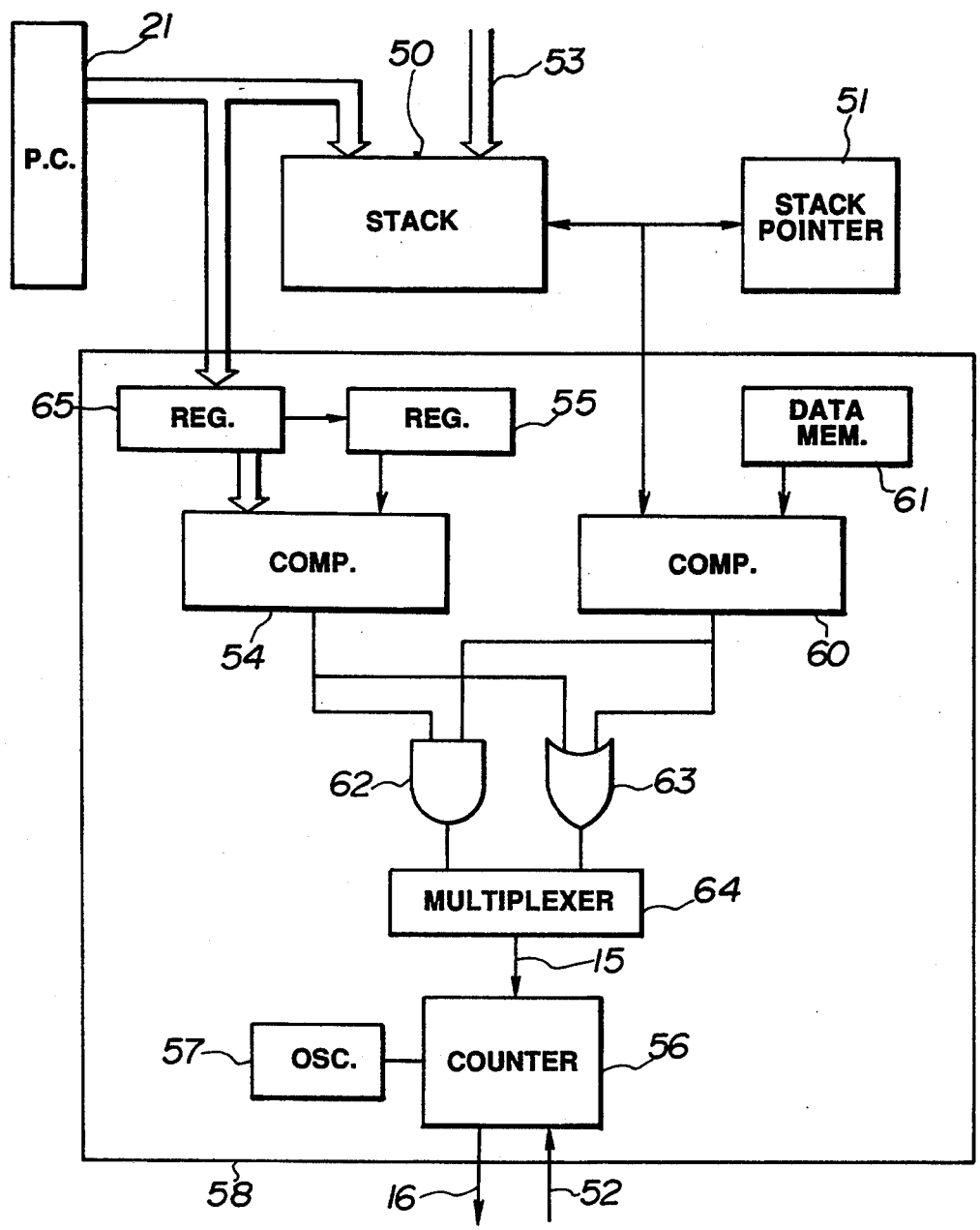
FIG. 7 is a circuit block diagram for the failure detecting circuit in a fifth preferred embodiment according to the present invention.

FIG. 7 shows a fifth preferred embodiment of the failure detecting apparatus in which a stack to be carried out in an interrupt routine or in a subroutine.

A stack is defined as that portion of a computer memory and/or registers used to temporarily hold the informations. The interrupt routine in the microcomputer starts the interrupt program upon completion of storing the value in the program counter and other data in the stack. That is to say, during the interrupt routine or subroutine, both the counter value in the program counter 21 and the other data 53 are stored in the stack 50 to start the interrupt or subroutine. Upon end of the interrupt routine or subroutine, the same counter value is returned into the program counter 21 to restore the data. Hence, the same counter value appears within the predetermined period of time.

The subroutine is defined as a system or sequence of machine instructions that complete the carefully defined function or program, or a set of instructions in machine code to direct the computer to carry our a well-defined mathematical or logical operation.

The interrupt routine is defined as a program that performs interrupt action to coordinate the timing I/O with processing.

The watch-dog timer 58 receives the counter value whenever the counter value of the program counter 21 at the time of the interrupt is input or output to the stack 50. A previous count value is transferred from the register 65 into the comparison register 55. The comparator 54 compares the count value from the register 65 with a previous count value present in the comparison register 55.

An interrupt signal 52 or subroutine signal is used to start the .counter 56 which counts the frequency of the oscillator 57. When the comparison is made by means of a comparator 54, the reset signal 15 is supplied to the counter 56 Via an OR gate 63 to reset the counter 56. If the same program counter value is not derived within the predetermined time, the counter 56 overflows to output the error detection signal 16.

Since, in the stack pointer 51, even a dense subroutine always returns to an original pointer position after a predetermined time, the reset signal 15 is supplied to the counter 56 via an OR gate 63 to reset the counter 56 if the comparator 60 receives the same pointer value as a predetermined pointer value set in the comparison data memory 61 within a predetermined time. If the comparator 60 does not receive within the predetermined time, the counter 56 overflows to output the error detection signal 16.

In the fifth preferred embodiment, either the program counter or stack pointer is monitored.

Furthermore, as shown in FIG. 7, the reset signal is output only when both conditions of the coincidence in the counter value of the program counter 21 and coincidence in the pointer value in the stack pointer 51 are established. Thus, such a route in which both outputs of the comparator 54 and 60 are supplied to the counter 56 via an AND gate 62 is provided so that a multiplexer 64 can switch whether it is via the OR gate route or via the AND gate route.

In this way, the input or output of the stack 50 is checked so that a watch-dog timer 58 can monitor whether the subroutine is normally finished or the interrupt routine is well done, or so on.

Figure 8:
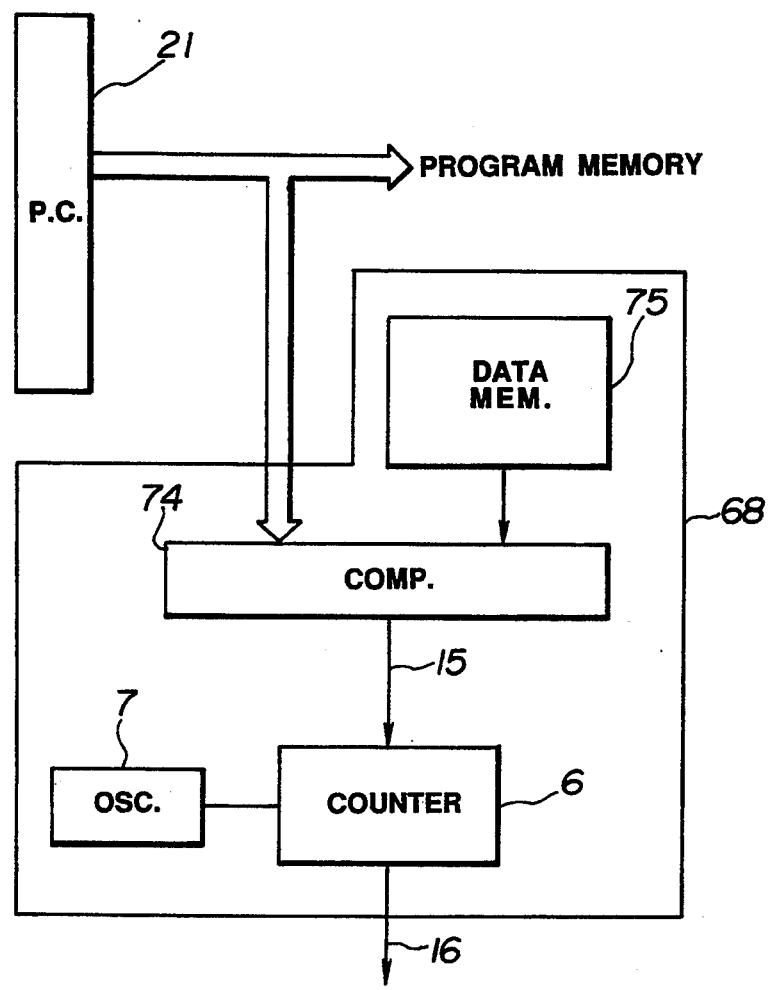
FIG. 8 is a circuit block diagram for the failure detecting circuit in a sixth preferred embodiment according to the present invention.

It is noted that although, in the fifth preferred embodiment shown in FIG. 7, the stack situation when the interrupt routine or subroutine is processed is monitored, in a case where the control over the predetermined period of time is carried out, the program is repeated as a whole. Therefore, the program counter can directly be checked as shown in FIG. 8.

That is to say, with a predetermined counter value of the program counter 21 set in the comparison data memory 75 of the watch-dog timer 68, the comparator 74 serves to compare the output of the program counter 21 with a predetermined counter value of the comparison data memory 75. Since the program is repeated, the predetermined counter value in the comparison data memory 75 always appears within the predetermined period of time if the program runs normally.

Then, when the comparator 74 indicates coincidence, the reset signal 15 is supplied to the counter 6. When some abnormality occurs in the stream of program, the program counter value set in the comparison data memory 75 does not appear within the predetermined period of time and, therefore, the counter 6 overflows to output the error detection signal 16.

Figure 9:
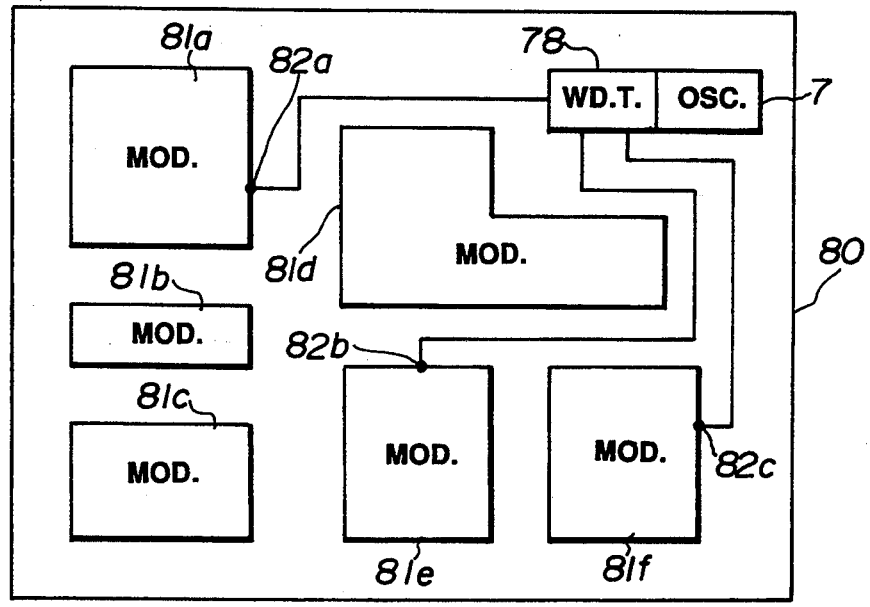
FIG. 9 is an explanatory view of an example of the failure detecting circuit which is arranged on a microcomputer.

FIG. 9 shows an example of an architecture constituted on a microcomputer by the watch-dog timer in each preferred embodiment.

In FIG. 9, a single function-concentrated watch-dog timer represented by 78 in the microcomputer 80 is installed. The oscillator 7, e.g., shown in FIG. 2 is included in the watch-dog timer 78. Hence, the single oscillator can be applied to the watch-dog timer 78.

A plurality of circuit modules 81a through 81f are incorporated in the microcomputer 80 in which monitoring points 82a through 82c are set which indicate the internal states such as the micro-instructions, instruction number for program counter described above are set so that the watch-dog timer 78 concentratedly monitors. Since the watch-dog timer is the single, no large occupied area is necessary as a whole.

Figure 10:
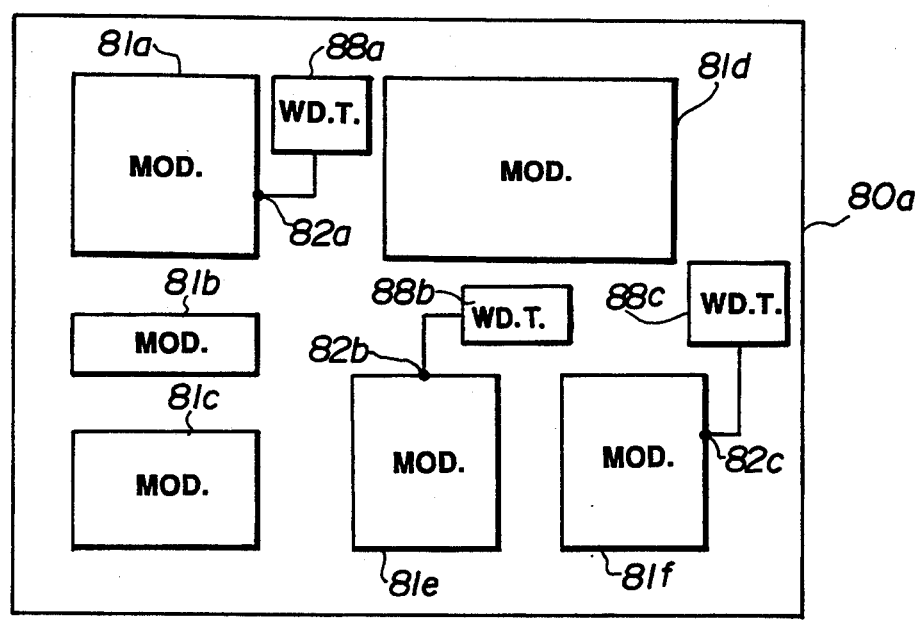
FIG. 10 is an explanatory view of another example of the failure detecting circuit which is arranged on a microcomputer.

FIG. 10 shows another example of the architecture of the failure detecting apparatus in the microcomputer.

The watch-dog timers 88a through 88c are arranged in a function dispersion type in the microcomputer 80a.

Although the number of the watch-dog timers is increased and the whole area is accordingly increased, it is suitable in a case where the number of monitoring points 82a through 82c becomes many and the wiring becomes problematic since the wiring is at the minimum. The oscillators are respectively installed to enhance a fault restraint characteristic.

Figure 11:
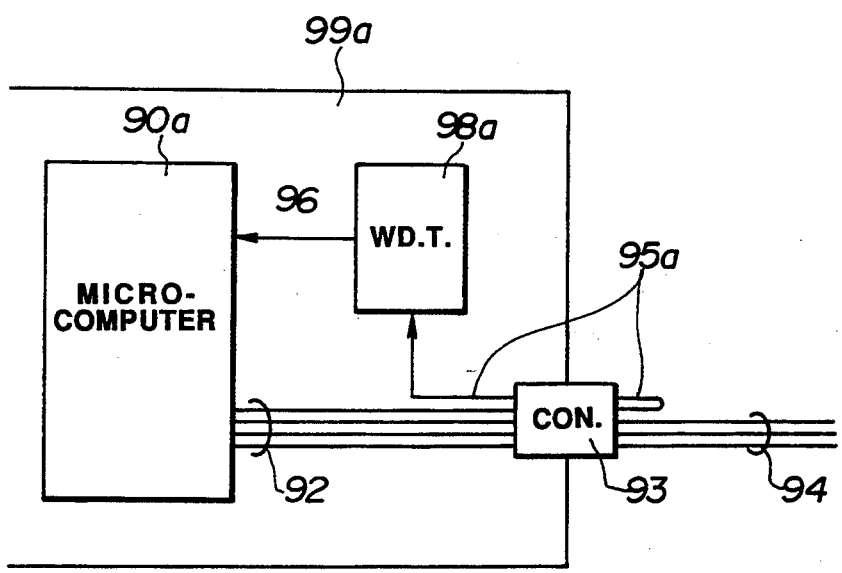
FIG. 11 is an explanatory view of an example of a connector portion failure detecting circuit.

FIG. 11 shows an example of the watch-dog timer which detects the failure in the connector portion by means of which an input/output portion of a control unit constituted by the microcomputer, particularly, an output port of the microcomputer is connected to a communication line forwarded to an external sensor or actuator.

The output port 92 of the microcomputer 90a is connected to the communication line 94 external to the control unit 99a via the connector 93. The watch-dog timer 98a within the same control unit outputs the error detection signal 96 to the microcomputer as its reset or interrupt signal.

A reset terminal of the watch-dog timer 98a itself receives the signal 95a, being wired from the communication line 94 derived externally from the connector 93.

In this case, as shown in the drawings, the same connector 93 may be folded into the control unit 99a. As the input signal, the reset signal can be used as the program which flows into the particular communication line.

In the normal state, since the reset signal enters the reset terminal at the same period as the predetermined control period, the watch-dog timer does not overflow. On the other hand, in addition to the case where the failure occurs in the microcomputer 90a, the reset signal disappears at the reset terminal of the watch-dog timer if the output port or connector 93 fails. The error detection signal is output from the watch-dog timer.

It is noted that if the comparator is incorporated which checks the data coincidence within the watch-dog timer and is reset when they coincide with the predetermined data, an on-line failure detection is carried out. At this time, when one communication line fails, the output port is switched to monitor it on the other communication line.

Figure 12:
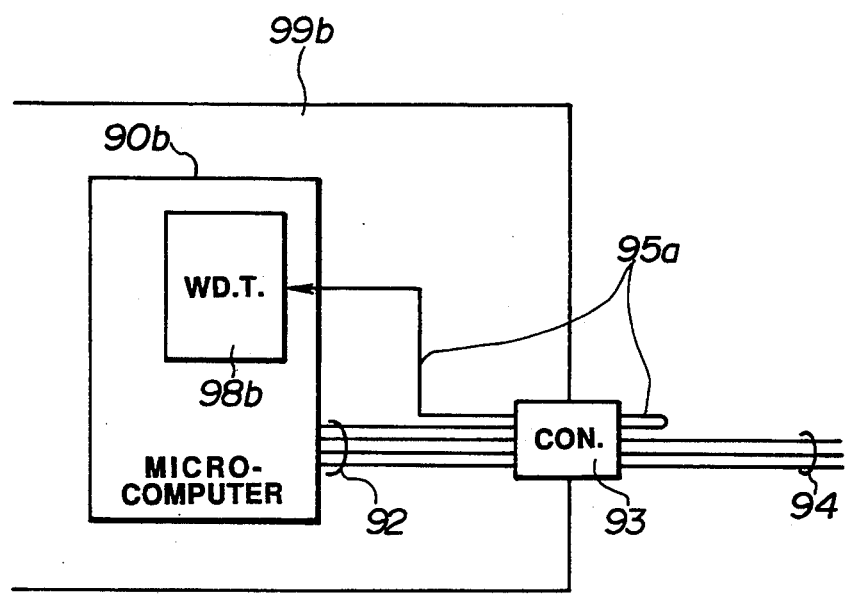
FIG. 12 is an explanatory view of another example of the connector portion failure detecting circuit.

FIG. 12 shows the microcomputer 90b in which the watch dog timer 98b is incorporated into the microcomputer 90b.

The reset signal input of the watch-dog timer is installed as the IC pin of the microcomputer.

In the same way as the previous example, the signal 95a to be checked is introduced to the IC pin from the communication line 94 external to the control unit 99b once via the connector 93.

It is noted that a check pattern by means of the watch-dog timer includes: a combination logic of the signal of a plurality of communication lines; a watch-dog timer for each communication line which is installed; and a microcomputer's output which takes the combination logic of the plurality of watch-dog timers. The appropriate combination is selected according to the object of monitoring which takes the microcomputer's output.

As described hereinabove, since according to the present invention an internal state of the microcomputer is monitored and a particular internal state to be generated when it normally operates does not appear within the predetermined time, the error detection signal is not output so that the monitoring can be made if the check point does not enter the check point.

In addition, since the internal state is checked, the failure detection rate is remarkably improved and, furthermore, the time from the failure to the detection may be shortened.

Thus the error expansion can be prevented. At this time, no limitation on the failure model is provided and the error particularization can also be achieved since the information can be monitored.

In addition, since in a case where the address is monitored as the internal state, the relative or indirect address can be specified as the comparison data and, therefore, the setting thereof becomes facilitated.

It is noted that since the technique by means of the sign check for the data abnormality is superior, the combination of the technique and the present invention can achieve the microcomputer system having a fault tolerant characteristic having a high failure detection rate.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A watch-dog timer for detecting a failure of a microcomputer, comprising:

comparison means, connected to an internal node of the microcomputer, said internal node defining an internal status of the microcomputer, for monitoring whether the internal status changing during an operation of the microcomputer coincides with a particular internal state, which would appear on the internal node if the microcomputer operated normally and outputting a coincidence signal when they coincide with each other;

first counting means for counting a number of regularly output signals to measure a time and outputting an overflow signal whenever a count value thereof reaches a predetermined limit value, said first counting means being reset when receiving the coincidence signal and said overflow signal being provided as an error detection signal;

a second counting means for counting the number of coincidence signals derived from said comparison means; and series connected registers, wherein one of said registers holds the latest measured value of said second counting means and the other of said registers holds a previous measured value of said second counting means and wherein said comparison means includes a comparator for comparing the contents of both registers and outputting the error detection signal when the result of comparison thereof indicates no coincidence.

2. A circuit for detecting a failure in a microcomputer, comprising:

a) a first comparator connected to an internal node of the microcomputer, said first comparator receiving an internal status of the microcomputer, said internal status of the microcomputer changing during an operation of the microcomputer, the internal status not being converted into an externally output status form and said internal status being monitored by the circuit by comparing said internal status with a particular internal status, said particular internal status being a reference data generated when the microcomputer operates normally, said first comparator outputting a signal whenever the internal status coincides with the particular internal status within a predetermined period of time;

b) a first counter for measuring a time and for outputting an overflow signal whenever the measured time exceeds the predetermined period of time, said measured time being synchronized with a program running time period of the microcomputer;

c) an output block for generating and outputting an error detection signal in response to the overflow signal of said first counter based on a predetermined condition related to the output signal of said first comparator whenever the output signal does not output from said first comparator within the predetermined period of time measured by said first counter, wherein said output signal of the first comparator serves as a reset signal supplied to said first counter so that said first counter is reset and wherein said output block outputs the error detection signal when no reset signal is output from the first comparator to the first counter for a predetermined period of time and said first counter overflows, wherein said error detection signal is the overflow signal derived from said first counter, said internal status includes a number of microinstructions and wherein said circuit further includes:

a second counter which counts incrementally the number of output signals derived from said first comparator for a constant period of time measure by said first counter;

two series connected registers, one register storing a count result of said second counter and the count result being shifted to the other register in response to a reset signal derived from said first counter to said second counter when the constant period of time measured by said first counter is reached; and a second comparator for comparing the contents of said one register indicating the count result of said first counter at the present program running period with the contents of said other register indicating the count result of said first counter at a previous program running period and for outputting an error detection signal when they do not coincide with each other.

3. A circuit for detecting a failure in a microcomputer, comprising:

a) a first comparator connected to an internal node of the microcomputer, said first comparator receiving an internal status of the microcomputer, said internal status of the microcomputer changing during an operation of the microcomputer, the internal status not being converted into an externally output status form and said internal status being monitored by the circuit by comparing said internal status with a particular internal status, said particular internal status being a reference data generated when the microcomputer operates normally, said first comparator outputting a signal whenever the internal status coincides with the particular internal status within a predetermined period of time;

b) a first counter for measuring a time and for outputting an overflow signal whenever the measured time exceeds the predetermined period of time, said measured time being synchronized with a program running time period of the microcomputer; and c) an output block for generating and outputting an error detection signal in response to the overflow signal of said first counter based on a predetermined condition related to the output signal of said first comparator whenever the output signal does not output from said first comparator within the predetermined period of time measured by said first counter, wherein said output signal of the first comparator serves as a reset signal applied to said first counter so that said first counter is reset, and wherein the output block outputs the error detection signal whenever the reset signal is not output from the first comparator to the first counter during said predetermined period of time and said counter overflows, and wherein said error detection signal is the overflow signal derived from said first counter, and wherein said internal status is equal to a number of microinstructions, and wherein said output block includes a second counter for counting incrementally the number of output signals derived from said first comparator in a constant period of time measured by said first counter;

a first register connected in series to a second register, said first register storing a count result of said second counter, the count result being shifted to said second register, in response to the reset signal derived from said first counter connected to said second counter, whenever the first counter reaches the constant period of time; and a second comparator for comparing the contents of said first register indicating the count result of said first counter at a present program running time period with the contents of the second register indicating the count result of the first counter at a previous program running time period and for outputting the error detection signal when said contents of said first register do not coincide with said contents of said second register.

4. A watch-dog timer for detecting a failure in a microcomputer, comprising:

a) comparison means, connected to an internal node of the microcomputer, said internal node not including status data output from the microcomputer, the status data being data externally monitored via a port of said microcomputer, said comparison means monitoring whether the internal status changing during an operation of the microcomputer coincides with a particular internal status which would appear on the internal node when the microcomputer operates normally and for outputting a coincidence signal whenever the internal status coincides;

b) first counting means for counting a number of regularly output signals to measure a time and outputting an overflow signal whenever the count value thereof reaches a predetermined limit value, said counting means being reset upon receiving the coincidence signal and said overflow signal being used as an error detection signal;

c) second counting means for counting a number of coincidence signals derived from said comparing means; and d) first and second registers connected in series to said second counting means, one of which holds a latest measured value of said second counting means and the other of which holds a previous measured value of said second counter means and wherein said comparing means includes a comparator which compares the contents of the first and second registers and outputs the error detection signal when the result of comparison thereof indicates no coincidence.

* * * * *